Jan. 24, 1956
G. SPATTA
2,731,856
VEHICLE DRIVE MEANS
Filed July 17, 1952
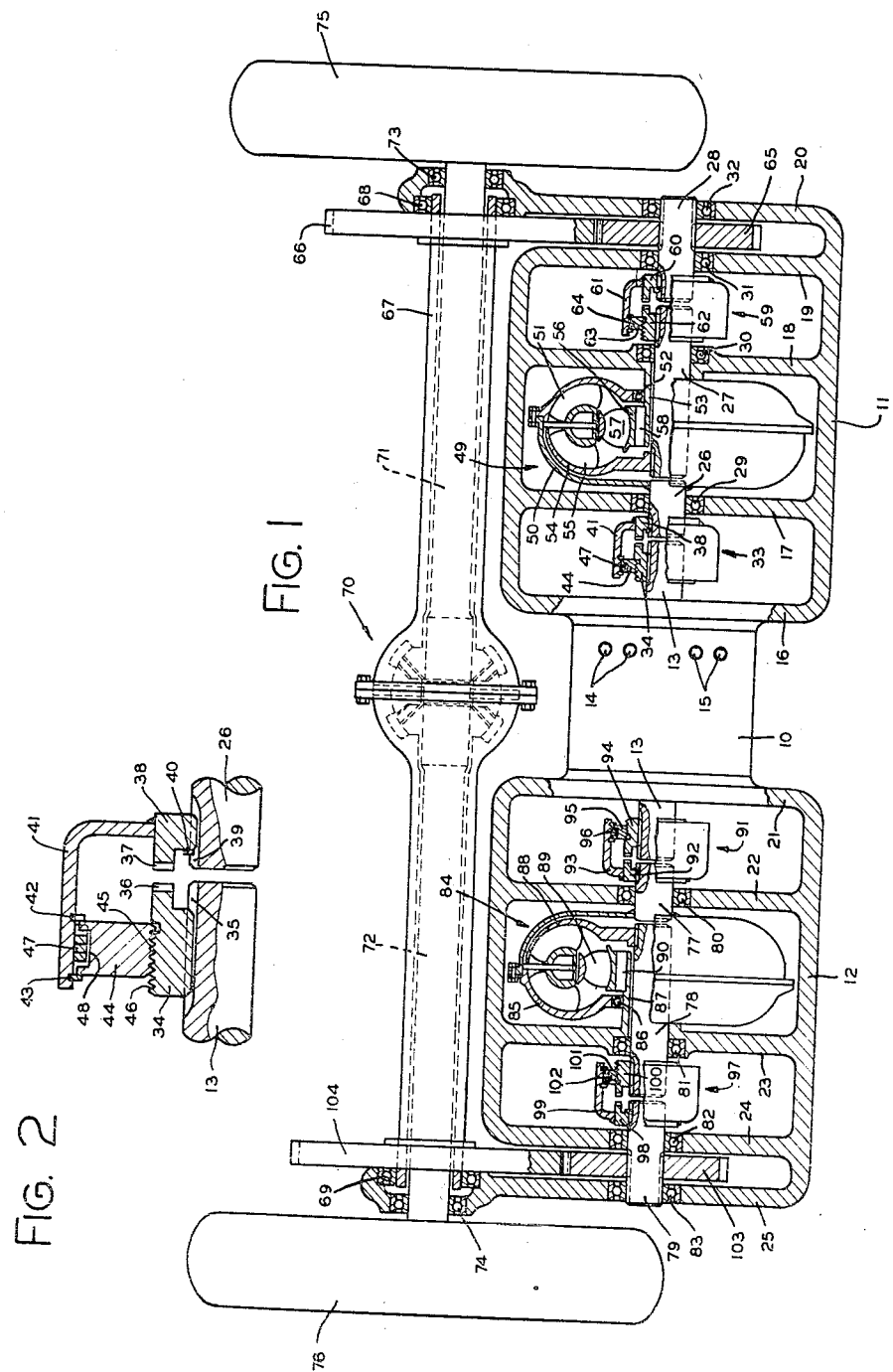
INVENTOR.
GEORGE SPATTA
BY
Brown, Jackson, Boettcher & Dienner
ATTYS.

United States Patent Office 2,731,856
Patented Jan. 24, 1956

2,731,856

VEHICLE DRIVE MEANS

George Spatta, Buchanan, Mich., assignor to Clark Equipment Company, Buchanan, Mich., a corporation of Michigan Application July 17, 1952, Serial No. 299,469

9 Claims. (Cl. 74—720)

My present invention relates generally to vehicle drive means, and, more specifically, is directed to drive means comprising an electric motor and a pair of fluid torque converter units.

At the present time in the material handling field, it is common to employ electric powered vehicles, familiarly known as industrial trucks, to engage, transport and deposit loads. The drive means of these vehicles usually assumes the form of an electric motor which is connected, through suitable gearing, to the drive shaft of the vehicle. In accelerating the vehicle from a standstill, and in both accelerating and propelling the vehicle up an incline or grade, high torque is required, and, under the noted conditions of operation, the electric motor draws a very high current from the source of electrical potential. Such heavy current requirements are undesirable particularly in those vehicles wherein batteries are employed as a source of electrical potential due to the fact that frequent recharging of the battery is required. Such drive means have further not proved satisfactory since an electric motor capable of developing high starting torque does not operate efficiently at high vehicle speeds.

It is an object of my present invention to provide drive means for a vehicle comprising an electric motor wherein the latter is drivingly connected to the vehicle drive shaft through variable torque multiplication means in order that the torque requirements imposed on the electric motor will remain substantially constant under varying conditions of vehicle operation.

In the preferred embodiment of my present invention I employ fluid torque converter means as the variable torque multiplication means. As will be understood by those skilled in the art, a conventional fluid torque converter unit is designed for transmitting torque in one direction only.

It is therefore another object of my present invention to provide drive means of the character noted wherein a torque converter unit is associated with each end of the motor armature shaft with one unit being arranged to transmit torque in a forward direction and the other unit being arranged to transmit torque in a reverse direction. By virtue of this construction, the direction of drive of the vehicle may be changed simply by reversing the direction of current flow to the electric motor.

It is a further object of my present invention to employ automatically operable clutch means for maintaining the reverse drive torque converter unit inoperative when the electric motor is driving in a forward direction, and for maintaining the forward drive torque converter unit inoperative when the electric motor is driving in a reverse direction, in order to eliminate fluid losses that would occur in the torque converter units if they were driven in a direction opposite to that for which they were designed.

It is a primary feature of my present invention that a constant torque type electric motor may be employed which has a high efficiency and is of low cost.

Now, in order to acquaint those skilled in the art with the manner of constructing and using vehicle drive means in accordance with the principles of my present invention, I shall describe in connection with the accompanying drawing, a preferred embodiment of my present invention.

In the drawing:

Figure 1 is a horizontal view of the drive means of my present invention with portions being broken away and shown in section; and Figure 2 is an enlarged partial sectional view of one of the clutch means employed in the drive means of Figure 1.

Referring now to the drawing, there is shown the drive means of my present invention which comprises a prime mover 10 preferably in the form of an electric motor. The motor 10 is suitably secured at its ends to housings 11 and 12 which are carried by the vehicle embodying the drive means of my present invention. The motor 10 has a driven or armature shaft 13 which projects into the housings 11 and 12. The armature shaft 13 may be driven clockwise, as viewed from the right end of the drawing, by selectively connecting the motor terminals 14 to a source of electrical potential such as a battery. The armature shaft 13 may be driven counterclockwise, as viewed from the right end of the drawing, by selectively connecting the motor terminals 15 to a source of electrical potential.

The housings 11 and 12 are preferably formed, respectively, with radial partitions or walls 16, 17, 18, 19 and 20, and 21, 22, 23, 24 and 25. Shafts 26, 27, and 28 are aligned in end to end axial relation within the housing 11. The shaft 26 is journaled in a ball bearing assembly 29 retained in wall 17; the shaft 27 is journaled in a ball bearing assembly 30 retained in wall 18; and the shaft 28 is journaled in ball bearing assemblies 31 and 32 retained, respectively, in walls 19 and 20.

Clutch means, indicated generally by the reference numeral 33, is provided for selectively clutching the shaft 26 to the armature shaft 13 when the latter rotates clockwise, as viewed from the right end of the drawing. The clutch means 33 comprises an annular clutch hub 34 slidably mounted on external straight splines 35 formed in the end of the armature shaft 13. The clutch hub 34 has radially extending circumferentially spaced ratchet type clutch teeth 36 which are adapted to be disposed in meshing engagement with the radially extending circumferentially spaced ratchet type clutch teeth 37 of a clutch hub 38 mounted on external straight splines 39 formed in the shaft 26. The clutch hub 38 is held against axial movement by means of a snap ring 40. An axially extending clutch drum 41 is suitably secured, as by welding, to the clutch hub 38. A pair of axially spaced locating rings 42 and 43 are secured within the inner periphery of the clutch drum 41. The rings 42 and 43 serve to prevent endwise movement of an annular clutch actuator ring 44 having internal left hand threads 45 which mate with external left hand threads 46 formed in the shiftable clutch hub 34. A coil spring friction clutch 47 is arranged about the outer periphery of the clutch actuator ring 44 within an annular groove 48. The one end of the spring 47 is secured to the actuator ring 44 while the other end of the spring 47 remains free.

When the armature shaft 13 is caused to rotate counterclockwise, as viewed from the right end of the drawing, the outer periphery of the spring 47 only lightly frictionally engages the inner periphery of the clutch drum 41, thereby permitting relative movement between the latter and the spring 47. The light frictional engagement of the spring 47 with the clutch drum 41, causes the clutch hub 34, through the action of the actuator ring 44, to be threaded to the left to the position shown in Figure 2. Now, when the armature shaft 13 is caused to rotate clockwise, as viewed from the right end of the drawing, the coil spring 47 is forced to expand into relatively heavy frictional engagement with the clutch drum 41. This clutching action causes the clutch hub 34 to be threaded to the right until the clutch teeth 36 are disposed in engagement with the clutch teeth 37 whereupon direct drive between the shafts 13 and 26 is established.

A fluid torque converter unit, indicated generally at 49, is provided for selectively effecting drive between the shafts 26 and 27. The torque converter unit 49 comprises a pump housing 50 having pump elements 51. The housing 50 is secured at one end to the shaft 26, and, at the other end, is journaled on a ball bearing assembly 52 mounted on an axial tubular portion 53 of the housing wall 18. Arranged within the pump housing 50 is a turbine member 54 having turbine elements 55. The turbine member 54 is secured to the shaft 27. A reaction member 56, having reaction elements 57, is disposed within the pump housing 50 and is mounted on a one way brake assembly 58 secured on the tubular portion 53 of the housing wall 18.

The shafts 27 and 28 are adapted to be selectively clutched together by means of clutch means, indicated generally by the reference numeral 59. The clutch means 59 is of the same construction and operation as the clutch means 33 described hereinbefore. The clutch means 59 in general comprises a clutch hub 60, to which a clutch drum 61 is secured, and a clutch hub 62 movement of which is adapted to be effected by an actuator ring 63 and a coil spring friction clutch 64. When the shaft 27 rotates clockwise, as viewed from the right end of the drawing, the clutch hub 62 is disposed in engagement with the clutch hub 60 for establishing drive between the shafts 27 and 28.

Secured to the shaft 28, intermediate of the walls 19 and 20, is a gear 65 that meshes with a gear 66 secured to a differential case 67 which is journaled at its ends in ball bearing assemblies 68 and 69 retained respectively in the extreme end housing walls 20 and 25. The differential case 67, in turn, drives a differential assembly, indicated generally at 70. The differential assembly 70 is associated with a pair of drive axles 71 and 72 which are journaled in ball bearing assemblies 73 and 74 retained respectively in the housing walls 20 and 25. Secured to the outer ends of the axles 71 and 72 are wheel and tire assemblies 75 and 76. The differential assembly 70 permits the wheels 75 and 76 to rotate at different speeds as is required, for example, when the vehicle embodying my invention is negotiating a curve.

Aligned in end to end axial relation within the housing 12 are shafts 77, 78 and 79. The shaft 77 is journaled in a ball bearing assembly 80 retained in the housing wall 22; the shaft 78 is journaled in a ball bearing assembly 81 retained in the housing wall 23; and the shaft 79 is journaled in ball bearing assemblies 82 and 83 retained, respectively, in housing walls 24 and 25.

A fluid torque converter unit 84 is provided for establishing drive between the shafts 77 and 78. The torque converter unit 84 is identical in construction to the torque converter 49 described hereinbefore but is mounted in reverse relation thereto. The torque converter 84 comprises a pump housing 85 secured at one end to the shaft 77 and journaled at the other end on a ball bearing assembly 86 secured on an axial tubular portion 87 of the housing wall 23. The unit 84 further comprises a turbine member 88, secured to the shaft 78, and a reaction member 89 mounted on a one way brake 90 carried on the tubular portion 87 of the housing wall 23.

Clutch means 91 is provided for selectively clutching the shaft 77 to the armature shaft 13 when the latter rotates counterclockwise, as viewed from the right end of the drawing. Clutch means 91 is identical in construction to the clutch means 33 except that the elements are arranged in reverse relation. The clutch means 91 comprises a clutch hub 92 and a clutch drum 93 secured thereto. The clutch means 91 further comprises a clutch hub 94 which is adapted to be moved selectively into engagement with the clutch hub 92 by an actuator ring 95 and a coil spring friction clutch 96.

The shafts 78 and 79 are adapted to be selectively clutched together by means of clutch means 97, which is identical in construction to the clutch means 91 and comprises a clutch hub 98, a clutch drum 99, a movable clutch hub 100, an actuator ring 101, and a coil spring friction clutch 102.

A gear 103 is secured to the shaft 79, intermediate of the housing walls 24 and 25, and has meshing engagement with a gear 104 secured to the differential case 67.

If the terminals 14 of the motor 10 are connected to a source of electrical potential, the armature shaft 13 will rotate clockwise, as viewed from the right end of the drawing. Clockwise rotation of the armature shaft 13 will cause the clutch hub 34 of the clutch means 33 to be moved into engagement with the clutch hub 38 for establishing drive between the shafts 13 and 26. Rotation of the shaft 26 will cause rotation of the shaft 27, through the torque converter unit 49, which, in turn, will cause the clutch hub 62 of the clutch means 59 to be moved into engagement with the clutch hub 60 for coupling the shafts 27 and 28 together.

With the motor armature shaft 13 rotating clockwise, the vehicle wheels 75 and 76 are driven in one direction through the clutch means 33, shaft 26, torque converter unit 49, shaft 27, clutch means 59, shaft 28, gear 65, gear 66, differential case 67, differential assembly 70, and drive axles 71 and 72.

Now, if the terminals 15 of the motor 10 are connected to a source of electrical potential, the armature shaft 13 will rotate counterclockwise, as viewed from the right end of the drawing. Counterclockwise rotation of the armature shaft 13 will cause the clutch means 33 and 59 to become inoperative and the clutch means 91 and 97 to be actuated.

With the motor armature shaft 13 rotating counterclockwise, the vehicle wheels 75 and 76 are driven in the other direction through the clutch means 91, shaft 77, torque converter 84, shaft 78, clutch means 97, shaft 79, gears 103 and 104, differential case 67, differential assembly 70, and drive axles 71 and 72.

The motor 10 is of the constant torque type which has a high efficiency and is of low cost. In order to obtain the necessary torque multiplication to accelerate the vehicle embodying the drive means of my present invention under varying load conditions and to both accelerate and propel the vehicle up various inclines and grades, I employ the aforedescribed torque converter units 49 and 84 which are of conventional construction and operation. For example, when torque is being multiplied by the unit 49, the reaction member 56 is held stationary by the one way brake assembly 58. When torque multiplication is not required, the one way brake assembly 58 permits the reaction member 56 to rotate conjointly with the pump and turbine members 50 and 54 to establish a direct drive fluid clutch.

The conventional fluid torque converter unit is designed for transmitting torque in one direction only. Now, since the direction of drive of the drive means of my present invention is changed by reversing the direction of current flow to the motor 10, it is necessary to provide a pair of torque converter units, one arranged to transmit torque in a forward direction, and the other arranged to transmit torque in a reverse direction. And, as a result of employing a pair of torque converter units, as described, it is necessary to maintain the reverse drive converter unit inoperative when the motor is energized for forward drive and to maintain the forward drive converter unit inoperative when the motor is energized for reverse drive, in order to eliminate the fluid losses that would be caused in the converter units if they were driven in a direction opposite to that for which they were designed. It is the clutch means 33, 59, 91 and 97 that serve to render automatically the proper converter unit operative and the other converter unit inoperative. It is to be noted that the converter unit which is to be inoperative is disconnected from both the motor armature shaft and the vehicle drive axles.

Now, while I have shown and described what I believe to be a preferred embodiment of my present invention, it will be understood that various rearrangements and modifications may be made therein without departing from the spirit and scope of my present invention.

I claim:

1. For use in a vehicle having a drive axle driven from a differential case, drive means comprising an electric motor including an armature shaft rotatable in either direction, variable torque multiplication means, means for coupling said variable torque multiplication means to said armature shaft responsive to rotation thereof in one direction and for uncoupling said variable torque multiplication means from said shaft responsive to rotation of the latter in the opposite direction, means for coupling said variable torque multiplication means to the differential case, and said variable torque multiplication means providing the required torque multiplication when said armature shaft rotates in said one direction in order that the torque requirements imposed on said electric motor will remain substantially constant under varying conditions of vehicle operation.

2. For use in a vehicle having a drive axle driven from a differential case, drive means comprising an electric motor including an armature shaft rotatable in either direction, variable torque multiplication means, automatically operable clutch means for coupling said variable torque multiplication means to said armature shaft responsive to rotation thereof in one direction and for uncoupling said variable torque multiplication means from said shaft responsive to rotation of the latter in the opposite direction, clutch means for coupling said variable torque multiplication means to the differential case, and said variable torque multiplication means providing the required torque multiplication when said armature shaft rotates in said one direction in order that the torque requirements imposed on said electric motor will remain substantially constant under varying conditions of vehicle operation.

3. For use in a vehicle having a drive axle driven from a differential case, drive means comprising an electric motor including an armature shaft rotatable in either direction, a fluid torque converter unit having pump and turbine members, automatically operable clutch means for coupling said pump member to said armature shaft only in one direction of rotation of the latter, automatically operable clutch means for coupling said turbine member to the differential case only in one direction of rotation of said armature shaft, and said fluid torque converter unit providing the required torque multiplication when said armature shaft rotates in said one direction in order that the torque requirements imposed on said electric motor will remain substantially constant under varying conditions of vehicle operation.

4. For use in a vehicle having a drive axle driven from a differential case, drive means comprising a constant torque electric motor having an armature shaft rotatable in either direction, variable torque multiplication means, means for clutching said variable torque multiplication means to said armature shaft only in one direction of rotation of the latter, means for coupling said variable torque multiplication means to the differential case, and said variable torque multiplication means providing the required torque multiplication when said armature shaft rotates in said one direction so that the torque developed by said electric motor is sufficient to operate the vehicle under varying conditions.

5. For use in a vehicle having a drive axle driven from a differential case, drive means comprising an electric motor including an armature shaft, first variable torque multiplication means, means for coupling said first variable torque multiplication means to one end of said armature shaft only in one direction of rotation of the latter, means for coupling said first variable torque multiplication means to the differential case only in the said one direction of rotation of said armature shaft, second variable torque multiplication means, means for coupling said second variable torque multiplication means to the other end of said armature shaft only in the other direction of rotation of the latter, means for coupling said second variable torque multiplication means to the differential case only in the said other direction of rotation of said armature shaft, and said first variable torque multiplication means providing the required torque multiplication when said armature shaft rotates in said one direction and said second variable torque multiplication means providing the required torque multiplication when said armature shaft rotates in said other direction in order that the torque requirements imposed on said electric motor will remain substantially constant under varying conditions of vehicle operation.

6. For use in a vehicle having a drive axle driven from a differential case, drive means comprising a constant torque electric motor having an armature shaft, first variable torque multiplication means, means for coupling said first variable torque multiplication means to one end of said armature shaft only in one direction of rotation of the latter, means for coupling said first variable torque multiplication means to the differential case only in the said one direction of rotation of said armature shaft, second variable torque multiplication means, means for coupling said second variable torque multiplication means to the other end of said armature shaft only in the other direction of rotation of the latter, means for coupling said second variable torque multiplication means to the differential case only in the said other direction of rotation of said armature shaft, and said first variable torque multiplication means providing the required torque multiplication when said armature shaft rotates in said one direction and said second variable torque multiplication means providing the required torque multiplication when said armature shaft rotates in said other direction so that the torque developed by said electric motor is sufficient to operate the vehicle under varying conditions.

7. For use in a vehicle having a drive axle driven from a differential case, drive means comprising an electric motor including an armature shaft, first variable torque multiplication means, automatically operable clutch means for coupling said first variable torque multiplication means to one end of said armature shaft only in one direction of rotation of the latter, automatically operable clutch means for coupling said first variable torque multiplication means to the differential case only in the said one direction of rotation of said armature shaft, second variable torque multiplication means, automatically operable clutch means for coupling said second variable torque multiplication means to the other end of said armature shaft only in the other direction of rotation of the latter, automatically operable clutch means for coupling said second variable torque multiplication means to the differential case only in the said other direction of rotation of said armature shaft, and said first variable torque multiplication means providing the required torque multiplication when said armature shaft rotates in said one direction and said second variable torque multiplication means providing the required torque multiplication when said armature shaft rotates in said other direction in order that the torque requirements imposed on said electric motor will remain substantially constant under varying conditions of vehicle operation.

8. For use in a vehicle having a drive axle driven from a differential case, drive means comprising an electric motor including an armature shaft, a first fluid torque converter unit having first pump and turbine members, means for coupling said first pump member to one end of said armature shaft only in one direction of rotation of the latter, means for coupling said first turbine member to the differential case only in the said one direction of rotation of said armature shaft, a second fluid torque converter unit having second pump and turbine members, means for coupling said second pump member to the other end of said armature shaft only in the other direction of rotation of the latter, means for coupling said second turbine member to the differential case only in the said other direction of rotation of said armature shaft, and said first fluid torque converter unit providing the required torque multiplication when said armature shaft rotates in said one direction and said second fluid torque converter unit providing the required torque multiplication when said armature shaft rotates in said other direction in order that the torque requirements imposed on said electric motor will remain substantially constant under varying conditions of vehicle operation.

9. For use in a vehicle having a drive axle driven from a differential case, drive means comprising an electric motor including an armature shaft, a first fluid torque converter unit having first pump and turbine members, automatically operable clutch means for coupling said first pump member to one end of said armature shaft only in one direction of rotation of the latter, automatically operable clutch means for coupling said first turbine member to the differential case only in the said one direction of rotation of said armature shaft, a second fluid torque converter unit having second pump and turbine members, automatically operable clutch means for coupling said second pump member to the other end of said armature shaft only in the other direction of rotation of the latter, automatically operable clutch means for coupling said second turbine member to the differential case only in the said other direction of rotation of said armature shaft, and said first fluid torque converter unit providing the required torque multiplication when said armature shaft rotates in said one direction and said second fluid torque converter unit providing the required torque multiplication when said armature shaft rotates in said other direction in order that the torque requirements imposed on said electric motor will remain substantially constant under varying conditions of vehicle operation.

References Cited in the file of this patent

UNITED STATES PATENTS

| | | |
|---|---|---|
| Re. 13,853 | Krohn | Dec. 29, 1914 |
| 653,855 | Torbensen | July 17, 1900 |
| 1,614,819 | Bauer et al. | Jan. 18, 1927 |
| 2,141,940 | Sinclair | Dec. 27, 1938 |
| 2,171,715 | Sinclair | Sept. 5, 1939 |
| 2,310,513 | Burns | Feb. 9, 1943 |
| 2,466,244 | Kelbel | Apr. 5, 1949 |
| 2,693,120 | Maybach | Nov. 2, 1954 |

FOREIGN PATENTS

| | | |
|---|---|---|
| 613,370 | Great Britain | Nov. 25, 1948 |
| 614,914 | Great Britain | Dec. 30, 1948 |
| 885,427 | France | Sept. 14, 1943 |
| 992,734 | France | Oct. 22, 1951 |